(No Model.) 2 Sheets—Sheet 1.

S. D. HOLLENBECK.
LATHE CHUCK.

No. 423,253. Patented Mar. 11, 1890.

WITNESSES:
C. L. Bendixon
Mark W. Dewey

INVENTOR:
Sullivan D. Hollenbeck
BY
Duell, Laass & Duell
his ATTORNEYS (No Model.) 2 Sheets—Sheet 2.

S. D. HOLLENBECK.
LATHE CHUCK.

No. 423,253. Patented Mar. 11, 1890.

WITNESSES:
C. L. Bendixon
Mark W. Dewey

INVENTOR:
Sullivan D. Hollenbeck
BY
Scully, Leass & Bull
his ATTORNEYS

UNITED STATES PATENT OFFICE.

SULLIVAN D. HOLLENBECK, OF ONEIDA, NEW YORK.

LATHE-CHUCK.

SPECIFICATION forming part of Letters Patent No. 423,253, dated March 11, 1890.

Application filed November 18, 1889. Serial No. 330,748. (No model.)

*To all whom it may concern:*

Be it known that I, SULLIVAN D. HOLLENBECK, of Oneida, in the county of Madison, in the State of New York, have invented new and useful Improvements in Lathe-Chucks, of which the following, taken in connection with the accompanying drawings, is a full, clear, and exact description.

This invention relates to the class of lathe and drill chucks in which the gripping-jaws are arranged rotary in the chuck-body and adjustable universally to move synchronously toward and from the axial center of the chuck.

The object of this invention is to reduce the diameter of the chuck to a minimum compared with its capacity of holding drills and analogous tools of various sizes, and also to render the chuck stronger and more durable and less expensive in its manufacture; and to that end the invention consists in the novel construction and combination of parts, hereinafter fully described, and specifically set forth in the claims.

Figure 1:
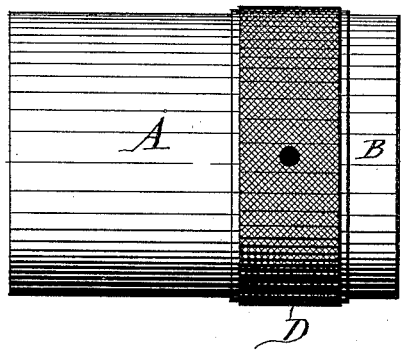
Figure 2:
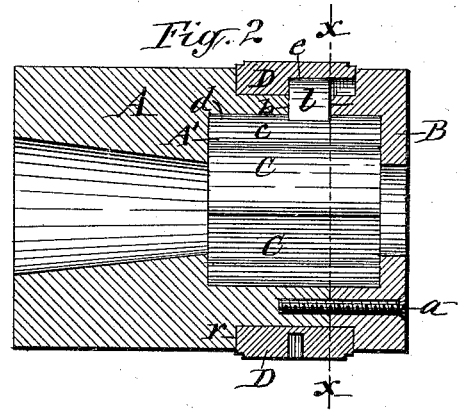
Figure 3:
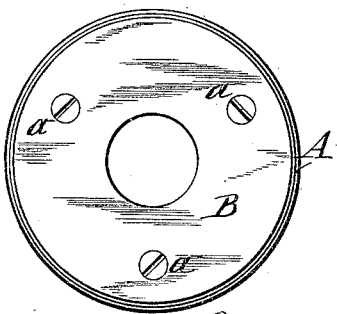
Figure 4:
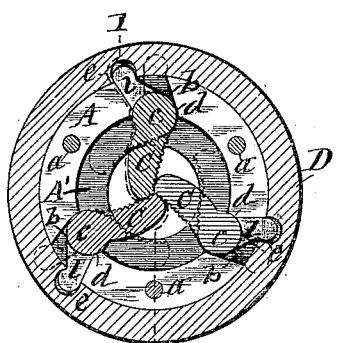
Figure 5:
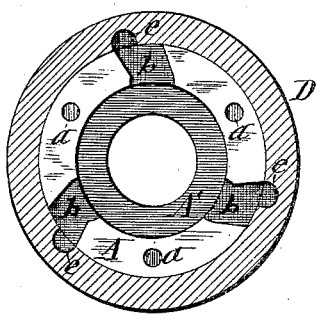
Figure 6:
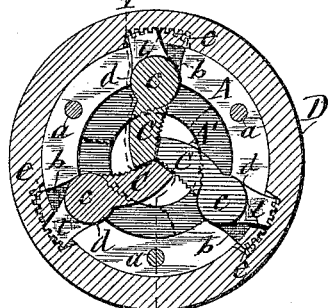
Figure 10:
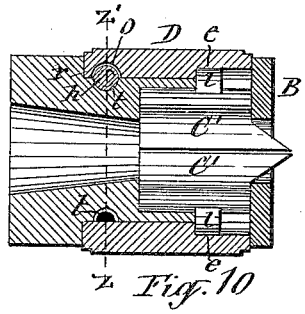
Figure 8:
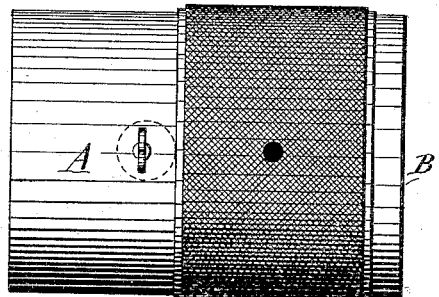
Figure 7:
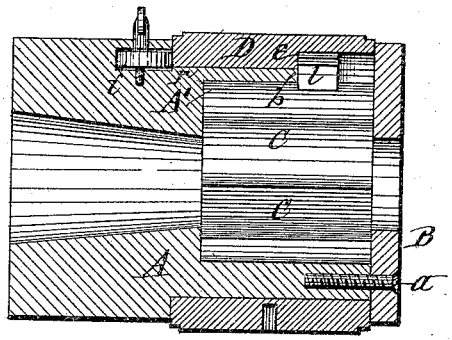
Figure 9:
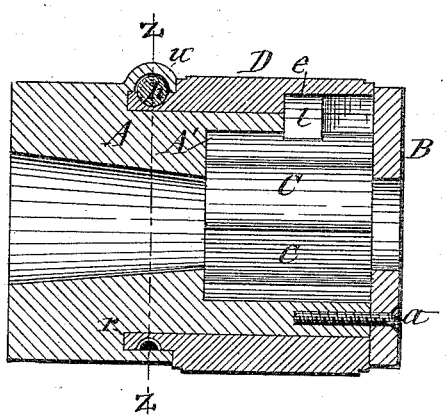
Figure 11:
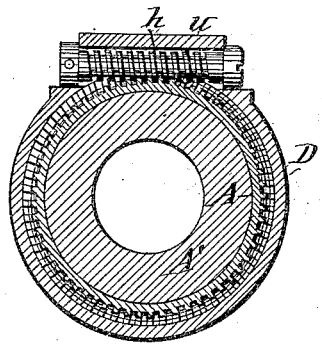
Figure 12:
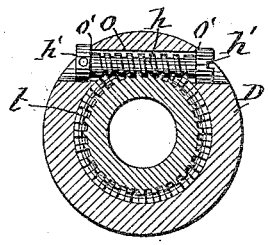
Figure 14:
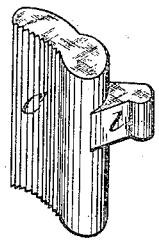
Figure 13:
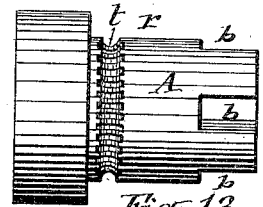

In the annexed drawings, Figure 1 is a side view of a chuck embodying my invention. Fig. 2 is a longitudinal section of the same on line 1 1, Fig. 4. Fig. 3 is a face view of the chuck. Fig. 4 is a transverse section on line $x\ x$, Fig. 2. Fig. 5 is an end view of the chuck-body minus the jaws and end cap. Fig. 6 is a transverse section showing a modification of the form of the jaws and of the means for transmitting motion from the rotary sleeve to said jaws. Fig. 7 is a longitudinal section of said modification on line $y\ y$, Fig. 6. Fig. 8 is a side view of the same. Figs. 9 and 10 are longitudinal sections of further modifications of my invention. Figs. 11 and 12 are transverse sections on lines $z\ z$ and $z'\ z'$ in Figs. 9 and 10. Fig. 13 is a detached side view of the chuck-body as constructed for the adjusting-screw shown in Figs. 10 and 12, and Fig. 14 is a detached perspective view of one of the jaws.

Similar letters of reference indicate corresponding parts.

A represents the chuck-body, which is formed with the annular cavity A' in one end and concentric with the axis of the chuck-body. To the face end of the said body is attached the cap B, usually by means of screws $a\ a\ a$, passing through the cap and longitudinally in the side of the chuck-body, said cap being provided with the usual central aperture and projecting over the cavity A' sufficiently to retain therein the jaws C C C, and projecting with its outer peripheral portion over the rabbet $r$, hereinafter described, and for the purposes there explained. The cap may either be formed with a section of the chuck-body, as shown in Fig. 2 of the drawings, or consist simply of an annular plate, as represented in Fig. 8 of the drawings. The inner wall of the cavity A' is formed with longitudinal grooves $d\ d\ d$, which are segmental in cross-section, and from each of said grooves extends radially out through the chuck-body an aperture $b$.

The jaws C C C are each formed with a transversely-rounded back $c$ of the form of a longitudinal section of a cylinder by which the jaw is seated in one of the grooves $d$. The grooves are slightly larger than a semicircle, so as to prevent the jaws from dropping out of the same when the chuck is not in use. Said grooves extend throughout the length of the cavity A' to allow the jaws C C C to be inserted with their backs $c\ c\ c$ endwise into the grooves, the cap B serving to retain the jaws in the body, as before mentioned. The jaws are thus seated rotatively in the chuck-body and are sustained throughout their lengths, so as to effectually resist the outward strain when in operation.

From the back of each jaw projects a crank-arm $l$, which extends through one of the apertures $b\ b$ of the chuck-body. The exterior of the chuck-body is formed with a smooth circumferential rabbet $r$, in which is seated a sleeve D, which has its inner side likewise smooth and provided with recesses or sockets $e\ e$, into which the ends of the crank-arms $l\ l\ l$ are fitted, so that by turning the said sleeve all of the said crank-arms are moved in unison, and this movement causes the jaws C C C to synchronously approach or recede from the center of the chuck, according to the direction in which the sleeve is turned. The projection of the cap B over the rabbet $r$, as hereinbefore described, serves to restrain longitudinal movement of the sleeve and to retain the same on the body. If desired, the crank-arms $l\ l\ l$ may be formed with cogs on their ends and the interior of the sleeve D provided with corresponding cogs meshing with those of the crank-arms, as shown in Fig. 6 of the drawings.

For the purpose of retaining the jaws more securely in their adjusted position a suitable tightener may be interposed between the sleeve D and body A. One form of such a tightener is shown in Figs. 7 and 8 of the drawings, and consists of a roller $i$, pivoted eccentrically to the chuck-body and adapted to bear with its periphery on the end of the sleeve D. In turning the sleeve to set the jaws C C C into their gripping position the roller $i$ is to be turned so as to bring it out of contact with the sleeve D, and after the jaws have been tightened on the drill gripped between them the aforesaid roller is to be turned so as to cause its periphery to tightly engage the sleeve in such a direction that a reverse movement of the sleeve will cause the roller to press more tightly against the sleeve. In lieu of the aforesaid roller may be used an adjusting-screw $h$, seated by one-half of its thickness in a smooth groove $o$, which extends preferably tangentially through the side of the sleeve D and terminates with outward shoulders $o'$ $o'$ at opposite ends, as shown in Figs. 10 and 12 of the drawings. The screw is formed at opposite ends with heads $h'$ $h'$, which abut against the shoulders $o'$ $o'$, and thereby prevent the screw from traveling endwise. The exterior of the chuck-body is formed with a circumferential groove $t$, which is semicircular in cross-section and of the same diameter as the screw, and is formed with screw-threads corresponding to and engaging with the screw.

Although I prefer the said arrangement of the screw in relation to the chuck-body and sleeve on account of its obviating undue projections on the exterior of the chuck, yet the same may be modified by forming the smooth seat for the screw in a flange $u$, projecting over a portion of the sleeve and providing the latter with the screw-threaded circumferential groove for engagement with the adjusting-screw $h$, as shown in Figs. 9 and 11 of the drawings. By turning the screw in either case rotary motion is imparted to the sleeve D, which actuates the jaws in the manner hereinbefore described.

To adapt the chuck for holding fine tools and for operating in recessed objects, I form the outer ends of the jaws $C'$ $C'$ tapering toward the axis of the chuck and of a length to cause them to protrude through the cap B, as shown in Fig. 10 of the drawings.

Having described my invention, what I claim as new, and desire to secure by Letters Patent, is—

1. The combination of the chuck-body formed with a central cavity, longitudinal grooves in the sides of the cavity, and the jaws formed with transversely-rounded backs and seated thereby in the aforesaid grooves, substantially as described and shown.

2. The combination of the chuck-body formed with an annular central cavity, longitudinal grooves in the sides of the cavity and apertures through the wall of the cavity, jaws formed with transversely-rounded backs and seated thereby in the aforesaid grooves and having crank-arms projecting through the aforesaid apertures, and a rotative sleeve on the exterior of the body engaging the ends of the aforesaid crank-arms, substantially as described and shown.

3. The combination of a chuck-body formed with a central cavity and with a circumferential rabbet in the exterior, jaws seated rotatively in the said cavity, and a sleeve seated rotatively in the rabbet of the chuck-body and actuating the jaws, and a cap on the end of the chuck-body projecting over the aforesaid rabbet and retaining the sleeve on the chuck-body, substantially as set forth.

4. The combination of a chuck-body formed with a central cavity, jaws seated rotatively in said cavity, a rotative sleeve on the exterior of the body actuating the jaws and formed with a smooth tangential groove terminating with shoulders at opposite ends, a circumferential screw-threaded groove in the exterior of the chuck-body, and a screw seated in the groove of the sleeve and engaging the screw-threads of the groove in the chuck-body, substantially as described and shown.

In testimony whereof I have hereunto signed my name this 9th day of November, 1889.

SULLIVAN D. HOLLENBECK. [L. S.]

Witnesses:
T. H. JURDEN,
NELSON G. STARK.